Jan. 20, 1931.   E. C. BALLMAN   1,789,349

SELF BASTING ROASTER

Filed Nov. 3, 1927

Inventor:
EDWIN C. BALLMAN,
His Attorney.

Patented Jan. 20, 1931

1,789,349

UNITED STATES PATENT OFFICE

EDWIN C. BALLMAN, OF ST. LOUIS, MISSOURI

SELF-BASTING ROASTER

Application filed November 3, 1927. Serial No. 230,713.

This invention pertains to roasters and particularly to roasters of the self-basting type.

One of the objects of this invention is to provide a utensil which may be used for roasting and which will automatically take care of properly basting the roast.

Another object is to provide such a device which is simple and cheap to construct and which may also be used for other purposes.

Further objects will appear from the following description, taken in connection with the accompanying drawing, in which—

Figure 1:
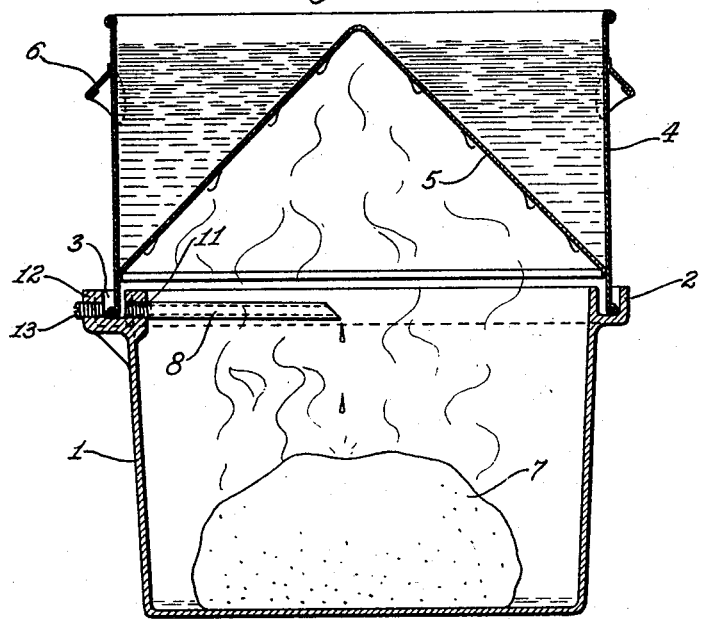
Figure 2:
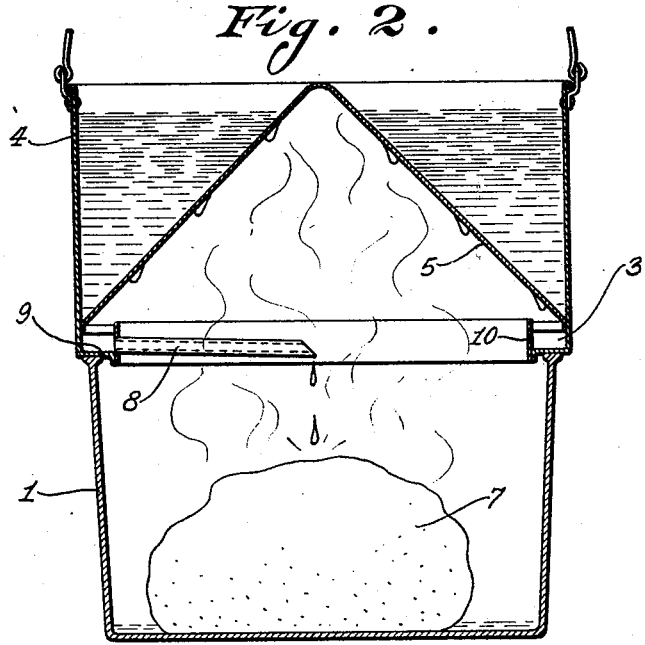

Figure 1 represents a cross-sectional view of a roaster embodying this invention; and Figure 2 is a similar view illustrating another embodiment of this invention.

Referring to the drawing, 1 designates a pot which may be constructed of cast metal, pressed sheet metal, or other suitable material. The pot is provided with a rim 2 having an annular trough 3 in the upper portion thereof. Arranged to seat in the trough 3 is a vessel 4 provided with a conical bottom or partition 5, the apex of which extends upwardly into the interior of the vessel. This vessel may be provided with handles 6 for manipulating the same. The upper edge of the pot and rim have bosses 11 and 12, the former of which can, therefore, be bored and tapped from the outside in order to receive a pipe 8, while the tapped hole in 12 is closed by a screw plug 13 which can also be set in to lightly clamp and hold the vessel 4 in place.

In the use of this roaster, the roast 7 is placed in the pot 1 with the proper amount of water, and the vessel 4 is seated in the trough 3 and filled with water. The water occupies the annular portion of the vessel surrounding the partition 5 and serves to keep this partition cool. The partition divides the vessel into an upper chamber for the water and a lower chamber, which is open to the pot 1, so that steam rising from the pot may come in contact with the partition 5, where it is condensed, and the moisture runs down into the trough 3. The pipe 8 may be removably attached to the rim 2 on the interior of the pot to provide an outlet for the moisture collected in the trough 3. The pipe extends substantially to the center of the pot so that moisture discharged therefrom will drop upon the roast and serve to continually baste the same during the roasting period.

In the embodiment of Figure 2, the pot 1 is formed with the trough in its rim, and the vessel 4 is formed with a bottom rim 9 adapted to rest upon the rim 1 and an upwardly extending flange 10 forming with the rim 9 the trough 3. The rim 10 provides an opening in the bottom of the vessel through which the steam may rise to be condensed when it comes in contact with the partition 5. The pipe 8 extends from the rim 10 to the center thereof so as to discharge its moisture upon the roast.

It will be seen that this invention provides a simple and effective utensil by means of which roasting operations may be carried out and which will automatically take care of basting. The pot 1 may be used alone for other operations, the pipe 8 being removed, in the case of Figure 1.

In the claims the expression "central portion of said chamber" is to be construed descriptively rather than limitatively, in order to define that feature of the invention in which the liquid is deposited on the roast in order to baste the same rather than being simply permitted to run down the side walls of the vessel. It is further obvious that various changes may be made, within the scope of the appended claims, in the details of construction without departing from the spirit of this invention; it is to be understood, therefore, that this invention is not limited to the specific details shown and described.

Having thus described the invention, what is claimed is:

1. A self-basting roaster, comprising, a container for the roast provided with an annular trough, a vessel mountable on said container to seat in said trough and having a partition providing an upper chamber adapted to contain cooling water and a lower condensing chamber open to said container and draining into said trough, and a discharge spout from said trough terminating over the central portion of said container.

2. A self-basting roaster, comprising, a container for the roast, a vessel mountable on said container and forming therewith a roasting chamber, said vessel being adapted to contain cooling water to condense the vapors in said chamber, means in said chamber for collecting the condensed liquid, and means for conducting the collected liquid to the central portion of said chamber and depositing the same upon the roast.

3. A self-basting roaster, comprising, a container for the roast, a vessel mountable on said container and forming therewith a roasting chamber, said vessel being adapted to contain cooling water to condense the vapors in said chamber, an annular trough extending around said chamber adapted to collect the condensed liquid, and a conduit from said trough to the central part of said chamber adapted to deliver the condensed liquid upon the roast at such central part.

4. A self-basting roaster, comprising, a container for the roast, a vessel mountable on said container to form therewith a roasting chamber and providing cooling surface to condense the vapors in said chamber, an annular trough extending around said chamber adapted to collect the condensed liquid, and means for conveying the collected liquid to the central portion of said chamber to be deposited on the roast.

5. A self-basting roaster, comprising, a container for the roast, a vessel mountable on said container to form therewith a roasting chamber and providing cooling surface to condense the vapors in said chamber, an annular trough extending around said chamber adapted to collect the condensed liquid, and a conduit adapted to convey the collected liquid to the central portion of said chamber and deposit it on the roast.

In testimony whereof I affix my signature this 10th day of May, 1927.

EDWIN C. BALLMAN.